United States Patent
Koepfer et al.

(10) Patent No.: US 11,542,286 B2
(45) Date of Patent: Jan. 3, 2023

(54) SILANE MIXTURES AND PROCESS FOR PREPARING SAME

(71) Applicant: Evonik Operations GmbH, Essen (DE)

(72) Inventors: Alexander Koepfer, Bernau im Schwarzwald (DE); Caren Roeben, Essen (DE); Andre Hasse, Juelich (DE); Frank Forster, Schoellkrippen (DE)

(73) Assignee: Evonik Operations GmbH, Essen (DE)

( * ) Notice: Subject to any disclaimer, the term of this patent is extended or adjusted under 35 U.S.C. 154(b) by 305 days.

(21) Appl. No.: 16/766,343

(22) PCT Filed: Nov. 16, 2018

(86) PCT No.: PCT/EP2018/081485
§ 371 (c)(1),
(2) Date: May 22, 2020

(87) PCT Pub. No.: WO2019/105757
PCT Pub. Date: Jun. 6, 2019

(65) Prior Publication Data
US 2020/0377531 A1  Dec. 3, 2020

(30) Foreign Application Priority Data
Nov. 28, 2017  (DE) ................... 10 2017 221 272.1

(51) Int. Cl.
*C08C 19/25* (2006.01)
*C07F 7/18* (2006.01)

(52) U.S. Cl.
CPC ............ *C07F 7/1804* (2013.01); *C08C 19/25* (2013.01)

(58) Field of Classification Search
CPC ......... C08K 5/548; C07F 7/081; C07F 7/1896
See application file for complete search history.

(56) References Cited

U.S. PATENT DOCUMENTS

| | | | |
|---|---|---|---|
| 10,562,923 B2 | 2/2020 | Roeben et al. | |
| 2003/0236424 A1* | 12/2003 | Yanagisawa | C07F 7/1804 556/427 |
| 2013/0281590 A1* | 10/2013 | Lin | C08K 5/5419 524/262 |
| 2014/0350173 A1 | 11/2014 | Matsuo | |

FOREIGN PATENT DOCUMENTS

| | | | |
|---|---|---|---|
| JP | 2012-149189 A | 8/2012 | |
| RU | 2 538 883 C2 | 1/2015 | |
| WO | WO 03/055452 A1 | 7/2003 | |
| WO | WO-03055452 A1 * | 7/2003 | ............ A61K 8/899 |

OTHER PUBLICATIONS

Khiterer, Chem. Mater. 2006, 18, 3665-3673. (Year: 2006).*
International Search Report dated Jan. 9, 2019 in PCT/EP2018/081485 filed Nov. 16, 2018, 3 Pages.
Mariya Khiterer, et al., "Hybrid Polyelectrolyte Materials for Fuel Cell Applications: Design, Synthesis, and Evaluation of Proton-Conducting Bridged Polysilsesquioxanes," Chemistry of Materials, vol. 18, No. 16, XP055535825, 2006, pp. 3665-3673.
U.S. Appl. No. 16/201,495, filed Nov. 27, 2018, US 2019/0161600 A1, Roeben, et al.
Russian Office Action dated Apr. 4, 2022 in Russian Patent Application No. 2020120558 (submitting English translation only), 4 pages.

* cited by examiner

*Primary Examiner* — Robert C Boyle
(74) *Attorney, Agent, or Firm* — Oblon, McClelland, Maier & Neustadt, L.L.P.

(57) ABSTRACT

The invention relates to silane mixtures comprising a silane of the formula I $$(R^1)_y(R^2)_{3-y}Si-R^3-(S-R^4)_n-S_x-R^5 \quad (I)$$

and a silane of the formula II $$(R^1)_y(R^2)_{3-y}Si-R^3-Si(R^1)_y(R^2)_{3-y} \quad (II)$$

where the molar ratio of silane of the formula I to silane of the formula II is 15:85-90:10.
The silane mixture according to the invention can be prepared by mixing the silanes of the formula I and silanes of the formula II.

11 Claims, No Drawings

SILANE MIXTURES AND PROCESS FOR PREPARING SAME

The invention relates to silane mixtures and to processes for preparation thereof.

EP 0670347 and EP 0753549 disclose rubber mixtures comprising at least one crosslinker, a filler, optionally further rubber auxiliaries and at least one reinforcing additive of the formula $$R^1R^2R^3Si-X^1-(-S_x-Y-)_m-(-S_x-X^2-SiR^1R^2R^3)_n.$$

JP2012149189 discloses the silane of the formula $(R^1O)_l R^2_{(3-l)}Si-R^3-(S_mR^4)_n-S-R^5$ with $R^5=-C(=O)-R^6$ $R^6=C1$-$C20$.

In addition, EP 1375504 discloses silanes of the formula $$(R^1O)_{(3-P)}(R^2)_pSi-R^3-S_m-R^4-(S_n-R^4)_q-S_m-R^3-Si(R^2)_P(OR^1)_{(3-P)}.$$

WO 2005/059022 discloses rubber mixtures comprising a silane of the formula $$[R^2R^3R^4Si-R^5-S-R^6-R^7-]R^1.$$

Additionally known are rubber mixtures comprising a bifunctional silane and a further silane of the formula (Y)G(Z) (WO 2012/092062) and rubber mixtures comprising bistriethoxysilylpropyl polysulfide and bistriethoxysilylpropyl monosulfide (EP1085045).

EP 1928949 discloses a rubber mixture comprising the silanes $(H_5C_2)_3Si-(CH_2)_3-X-(CH_2)_6-S_2-(CH_2)_6-X-(CH_2)_3-Si(OC_2H_5)_3$ and/or $(H_5C_2O)_3Si-(CH_2)_3-X-(CH_2)_{10}-S_2-(CH_2)_6-X-(CH_2)_{10}-Si(OC_2H_5)_3$ and $(H_5C_2O)_3Si-(CH_2)_3-S_m-(CH_2)_3-Si(OC_2H_5)_3$.

It is an object of the present invention to provide silane mixtures having improved rolling resistance and dynamic stiffness in rubber mixtures compared to silanes known from the prior art.

The invention provides a silane mixture comprising a silane of the formula I $$(R^1)_y(R^2)_{3-y}Si-R^3-(S-R^4)_n-S_x-R^5 \quad (I)$$

and a silane of the formula II $$(R^1)_y(R^2)_{3-y}Si-R^3-Si(R^1)_y(R^2)_{3-y} \quad (II)$$

where $R^1$ are the same or different and are $C_1$-$C_{10}$-alkoxy groups, preferably methoxy or ethoxy groups, phenoxy group, $C_4$-$C_{10}$-cycloalkoxy groups or alkyl polyether group $-O-(R^6-O)_r-R^7$ where $R^6$ are the same or different and are a branched or unbranched, saturated or unsaturated, aliphatic, aromatic or mixed aliphatic/aromatic divalent C1-C30 hydrocarbon group, preferably $-CH_2-CH_2-$, r is an integer from 1 to 30, preferably 3 to 10, and $R^7$ is unsubstituted or substituted, branched or unbranched monovalent alkyl, alkenyl, aryl or aralkyl groups, preferably a $C_{13}H_{27}$-alkyl group, $R^2$ is the same or different and is C6-C20-aryl groups, preferably phenyl, C1-C10-alkyl groups, preferably methyl or ethyl, C2-C20-alkenyl group, C7-C20-aralkyl group or halogen, preferably Cl, $R^3$ are the same or different and are a branched or unbranched, saturated or unsaturated, aliphatic, aromatic or mixed aliphatic/aromatic divalent C1-C30 hydrocarbon group, preferably C1-C20, more preferably C1-C10, even more preferably C2-C8, especially preferably $CH_2CH_2$, $CH_2CH_2CH_2$ and $(CH_2)_8$, $R^4$ are the same or different and are a branched or unbranched, saturated or unsaturated, aliphatic, aromatic or mixed aliphatic/aromatic divalent C1-C30 hydrocarbon group, preferably C1-C20, more preferably C1-C10, even more preferably C2-C7, especially preferably $(CH_2)_6$, x is an integer from 1 to 10, preferably 1 to 4, more preferably 1 or 2, when x is 1 $R^5$ is hydrogen or a $-C(=O)-R^8$ group with $R^8$=hydrogen, a C1-C20 alkyl group, preferably C1-C17, C6-C20-aryl groups, preferably phenyl, C2-C20-alkenyl group or a C7-C20-aralkyl group and n is 1, 2 or 3, preferably 1, when x is 2 to 10 $R^5$ is $-(R^4-S)_n-R^3-Si(R^1)_y(R^2)_{3-y}$ and n is 0, 1, 2 or 3, preferably 1, and y are the same or different and are 1, 2 or 3, and the molar ratio of silane of the formula I to silane of the formula II is 15:85-90:10, preferably 20:80-90:10, more preferably 25:75-90:10, most preferably 30:70-86:14.

Preferably, the silane mixture may comprise a silane of the formula I $$(R^1)_y(R^2)_{3-y}Si-R^3-(S-R^4)_n-S_x-R^5 \quad (I)$$

and a silane of the formula II $$(R^1)_y(R^2)_{3-y}Si-R^3-Si(R^1)_y(R^2)_{3-y} \quad (II)$$

where n is 1 and $R^1$, $R^2$, $R^3$, $R^4$, $R^5$, x and y have the same definition as described above.

The silane mixture according to the invention may comprise further additives or consist solely of silanes of the formula I and silanes of the formula II.

The silane mixture according to the invention may comprise oligomers that form as a result of hydrolysis and condensation of the silanes of the formula I and/or silanes of the formula II.

The silane mixture according to the invention may have been applied to a support, for example wax, polymer or carbon black. The silane mixture according to the invention may have been applied to a silica, in which case the binding may be physical or chemical.

$R^3$ and $R^4$ may independently be $-CH_2-$, $-CH_2CH_2-$, $-CH_2CH_2CH_2-$, $-CH_2CH_2CH_2CH_2-$, $-CH(CH_3)-$, $-CH_2CH(CH_3)-$, $-CH(CH_3)CH_2-$, $-C(CH_3)_2-$, $-CH(C_2H_5)-$, $-CH_2CH_2CH(CH_3)-$, $-CH(CH_3)CH_2CH_2-$, $-CH_2CH(CH_3)CH_2-$, $-CH_2CH_2CH_2CH_2-$, $-CH_2CH_2CH_2CH_2CH_2-$, $-CH_2CH_2CH_2CH_2CH_2CH_2-$, $-CH_2CH_2CH_2CH_2CH_2CH_2CH_2-$, $-CH_2CH_2CH_2CH_2CH_2CH_2CH_2CH_2-$, $-CH_2CH_2CH_2CH_2CH_2CH_2CH_2CH_2CH_2-$, $-CH_2CH_2CH_2CH_2CH_2CH_2CH_2CH_2CH_2CH_2-$, $-CH_2CH_2CH_2CH_2CH_2CH_2CH_2CH_2CH_2CH_2CH_2-$, $-CH_2CH_2CH_2CH_2CH_2CH_2CH_2CH_2CH_2CH_2CH_2CH_2-$, $-CH_2CH_2CH_2CH_2CH_2CH_2CH_2CH_2CH_2CH_2CH_2CH_2CH_2-$, $-CH_2CH_2CH_2CH_2CH_2CH_2CH_2CH_2CH_2CH_2CH_2CH_2CH_2CH_2-$, $-CH_2-H_2H_2$ or $R^1$ may preferably be methoxy or ethoxy.

Silanes of the formula I may preferably be:
$(EtO)_3Si-CH_2-S_2-CH_2-Si(OEt)_3$,
$(EtO)_3Si-(CH_2)_2-S_2-(CH_2)_2-Si(OEt)_3$,
$(EtO)_3Si-(CH_2)_3-S_2-(CH_2)_3-Si(OEt)_3$,
$(EtO)_3Si-CH_2-S_4-CH_2-Si(OEt)_3$,
$(EtO)_3Si-(CH_2)_2-S_4-(CH_2)_2-Si(OEt)_3$,
$(EtO)_3Si-(CH_2)_3-S_4-(CH_2)_3-Si(OEt)_3$,
$(EtO)_3Si-CH_2-S-(CH_2)-S_2-(CH_2)-S-CH_2-Si(OEt)_3$,
$(EtO)_3Si-(CH_2)_2-S-(CH_2)-S_2-(CH_2)-S-(CH_2)_2-Si(OEt)_3$,
$(EtO)_3Si-(CH_2)_3-S-(CH_2)-S_2-(CH_2)-S-(CH_2)_3-Si(OEt)_3$,
$(EtO)_3Si-CH_2-S-(CH_2)_2-S_2-(CH_2)_2-S-CH_2-Si(OEt)_3$,
$(EtO)_3Si-(CH_2)_2-S-(CH_2)_2-S_2-(CH_2)_2-S-(CH_2)_2-Si(OEt)_3$,
$(EtO)_3Si-(CH_2)_3-S-(CH_2)_2-S_2-(CH_2)_2-S-(CH_2)_3-Si(OEt)_3$,
$(EtO)_3Si-CH_2-S-(CH_2)_3-S_2-(CH_2)_3-S-CH_2-Si(OEt)_3$,
$(EtO)_3Si-(CH_2)_2-S-(CH_2)_3-S_2-(CH_2)_3-S-(CH_2)_2-Si(OEt)_3$,
$(EtO)_3Si-(CH_2)_3-S-(CH_2)_3-S_2-(CH_2)_3-S-(CH_2)_3-Si(OEt)_3$,
$(EtO)_3Si-CH_2-S-(CH_2)_4-S_2-(CH_2)_4-S-CH_2-Si(OEt)_3$,
$(EtO)_3Si-(CH_2)_2-S-(CH_2)_4-S_2-(CH_2)_4-S-(CH_2)_2-Si(OEt)_3$,
$(EtO)_3Si-(CH_2)_3-S-(CH_2)_4-S_2-(CH_2)_4-S-(CH_2)_3-Si(OEt)_3$,
$(EtO)_3Si-CH_2-S-(CH_2)_6-S_2-(CH_2)_5-S-CH_2-Si(OEt)_3$,
$(EtO)_3Si-(CH_2)_2-S-(CH_2)_5-S_2-(CH_2)_5-S-(CH_2)_2-Si(OEt)_3$,
$(EtO)_3Si-(CH_2)_3-S-(CH_2)_5-S_2-(CH_2)_5-S-(CH_2)_3-Si(OEt)_3$,
$(EtO)_3Si-CH_2-S-(CH_2)_6-S_2-(CH_2)_6-S-CH_2-Si(OEt)_3$,
$(EtO)_3Si-(CH_2)_2-S-(CH_2)_6-S_2-(CH_2)_6-S-(CH_2)_2-Si(OEt)_3$,
$(EtO)_3Si-(CH_2)_3-S-(CH_2)_6-S_2-(CH_2)_6-S-(CH_2)_3-Si(OEt)_3$.
$(EtO)_3Si-(CH_2)_3-S-(CH_2)-S-C(=O)-CH_3$,
$(EtO)_3Si-(CH_2)_3-S-(CH_2)-S-C(=O)-C_2H_5$,
$(EtO)_3Si-(CH_2)_3-S-(CH_2)-S-C(=O)-C_3H_7$,
$(EtO)_3Si-(CH_2)_3-S-(CH_2)-S-C(=O)-C_4H_9$,
$(EtO)_3Si-(CH_2)_3-S-(CH_2)-S-C(=O)-C_5H_{11}$,
$(EtO)_3Si-(CH_2)_3-S-(CH_2)-S-C(=O)-C_6H_{13}$,
$(EtO)_3Si-(CH_2)_3-S-(CH_2)-S-C(=O)-C_7H_{15}$,
$(EtO)_3Si-(CH_2)_3-S-(CH_2)-S-C(=O)-C_9H_{19}$,
$(EtO)_3Si-(CH_2)_3-S-(CH_2)-S-C(=O)-C_{11}H_{23}$,
$(EtO)_3Si-(CH_2)_3-S-(CH_2)-S-C(=O)-C_{13}H_{27}$,
$(EtO)_3Si-(CH_2)_3-S-(CH_2)-S-C(=O)-C_{15}H_{31}$,
$(EtO)_3Si-(CH_2)_3-S-(CH_2)-S-C(=O)-C_{17}H_{35}$,
$(EtO)_3Si-(CH_2)_3-S-(CH_2)_2-S-C(=O)-CH_3$,
$(EtO)_3Si-(CH_2)_3-S-(CH_2)_2-S-C(=O)-C_2H_5$,
$(EtO)_3Si-(CH_2)_3-S-(CH_2)_2-S-C(=O)-C_3H_7$,
$(EtO)_3Si-(CH_2)_3-S-(CH_2)_2-S-C(=O)-C_4H_9$,
$(EtO)_3Si-(CH_2)_3-S-(CH_2)_2-S-C(=O)-C_5H_{11}$,
$(EtO)_3Si-(CH_2)_3-S-(CH_2)_2-S-C(=O)-C_6H_{13}$,
$(EtO)_3Si-(CH_2)_3-S-(CH_2)_2-S-C(=O)-C_7H_{15}$,
$(EtO)_3Si-(CH_2)_3-S-(CH_2)_2-S-C(=O)-C_9H_{19}$,
$(EtO)_3Si-(CH_2)_3-S-(CH_2)_2-S-C(=O)-C_{11}H_{23}$,
$(EtO)_3Si-(CH_2)_3-S-(CH_2)_2-S-C(=O)-C_{13}H_{27}$,
$(EtO)_3Si-(CH_2)_3-S-(CH_2)_2-S-C(=O)-C_{15}H_{31}$,
$(EtO)_3Si-(CH_2)_3-S-(CH_2)_2-S-C(=O)-C_{17}H_{35}$,
$(EtO)_3Si-(CH_2)_3-S-(CH_2)_3-S-C(=O)-CH_3$,
$(EtO)_3Si-(CH_2)_3-S-(CH_2)_3-S-C(=O)-C_2H_5$,
$(EtO)_3Si-(CH_2)_3-S-(CH_2)_3-S-C(=O)-C_3H_7$,
$(EtO)_3Si-(CH_2)_3-S-(CH_2)_3-S-C(=O)-C_4H_9$,
$(EtO)_3Si-(CH_2)_3-S-(CH_2)_3-S-C(=O)-C_5H_{11}$,
$(EtO)_3Si-(CH_2)_3-S-(CH_2)_3-S-C(=O)-C_6H_{13}$,
$(EtO)_3Si-(CH_2)_3-S-(CH_2)_3-S-C(=O)-C_7H_{15}$,
$(EtO)_3Si-(CH_2)_3-S-(CH_2)_3-S-C(=O)-C_9H_{19}$,
$(EtO)_3Si-(CH_2)_3-S-(CH_2)_3-S-C(=O)-C_{11}H_{23}$,
$(EtO)_3Si-(CH_2)_3-S-(CH_2)_3-S-C(=O)-C_{13}H_{27}$,
$(EtO)_3Si-(CH_2)_3-S-(CH_2)_3-S-C(=O)-C_{15}H_{31}$,
$(EtO)_3Si-(CH_2)_3-S-(CH_2)_3-S-C(=O)-C_{17}H_{35}$,
$(EtO)_3Si-(CH_2)_3-S-(CH_2)_6-S-C(=O)-CH_3$,
$(EtO)_3Si-(CH_2)_3-S-(CH_2)_6-S-C(=O)-C_2H_5$,
$(EtO)_3Si-(CH_2)_3-S-(CH_2)_6-S-C(=O)-C_3H_7$,
$(EtO)_3Si-(CH_2)_3-S-(CH_2)_6-S-C(=O)-C_4H_9$,
$(EtO)_3Si-(CH_2)_3-S-(CH_2)_6-S-C(=O)-C_5H_{11}$,
$(EtO)_3Si-(CH_2)_3-S-(CH_2)_6-S-C(=O)-C_6H_{13}$,
$(EtO)_3Si-(CH_2)_3-S-(CH_2)_6-S-C(=O)-C_7H_{15}$,
$(EtO)_3Si-(CH_2)_3-S-(CH_2)_6-S-C(=O)-C_9H_{19}$,
$(EtO)_3Si-(CH_2)_3-S-(CH_2)_6-S-C(=O)-C_{11}H_{23}$,
$(EtO)_3Si-(CH_2)_3-S-(CH_2)_6-S-C(=O)-C_{13}H_{27}$,
$(EtO)_3Si-(CH_2)_3-S-(CH_2)_6-S-C(=O)-C_{15}H_{31}$,
$(EtO)_3Si-(CH_2)_3-S-(CH_2)_6-S-C(=O)-C_{17}H_{35}$, Especially preferred is the silane of the formula I
$(EtO)_3Si-(CH_2)_3-S-(CH_2)_6-S_2-(CH_2)_6-S-(CH_2)_3-Si(OEt)_3$, $(EtO)_3Si-(CH_2)_3-S-(CH_2)_6-S-C(=O)-CH_3$,
$(EtO)_3Si-(CH_2)_3-S-(CH_2)_6-S-C(=O)-C_7H_{15}$ and $(EtO)_3Si-(CH_2)_3-S-(CH_2)_6-S-C(=O)-C_{17}H_{35}$.

Silanes of the formula II may preferably be:
$(EtO)_3Si-(CH_2)-Si(OEt)_3$,
$(EtO)_3Si-(CH_2)_2-Si(OEt)_3$,
$(EtO)_3Si-(CH_2)_3-Si(OEt)_3$,
$(EtO)_3Si-(CH_2)_4-Si(OEt)_3$,
$(EtO)_3Si-(CH_2)_5-Si(OEt)_3$,
$(EtO)_3Si-(CH_2)_6-Si(OEt)_3$,
$(EtO)_3Si-(CH_2)_7-Si(OEt)_3$,
$(EtO)_3Si-(CH_2)_8-Si(OEt)_3$,
$(EtO)_3Si-(CH_2)_9-Si(OEt)_3$,
$(EtO)_3Si-(CH_2)_{10}-Si(OEt)_3$, Especially preferred is the silane of the formula II
$(EtO)_3Si-(CH_2)_8-Si(OEt)_3$.

Very particular preference is given to a silane mixture of $(EtO)_3Si-(CH_2)_3-S-(CH_2)_6-S_2-(CH_2)_6-S-(CH_2)_3-Si(OEt)_3$, $(EtO)_3Si-(CH_2)_3-S-(CH_2)_6-S-C(=O)-CH_3$, $(EtO)_3Si-(CH_2)_3-S-(CH_2)_6-S-C(=O)-C_7H_{15}$ or $(EtO)_3Si-(CH_2)_3-S-(CH_2)_6-S-C(=O)-C_{17}H_{35}$ and $(EtO)_3Si-(CH_2)_8-Si(OEt)_3$.

The present invention further provides a process for preparing the silane mixture according to the invention, which is characterized in that the silane of the formula I

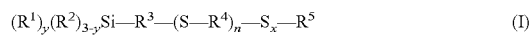  (I)

and a silane of the formula II

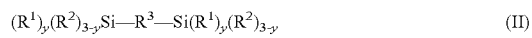  (II)

where $R^1$, $R^2$, $R^3$, $R^4$, $R^5$, n, x and y have the definition given above
are mixed in a molar ratio of 15:85-90:10, preferably 20:80-90:10, more preferably 25:75-90:10, most preferably 30:70-86:14.

Preferably, a silane of the formula I

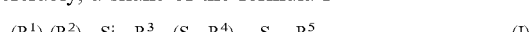  (I)

and a silane of the formula II

  (II)

where $R^1$, $R^2$, $R^3$, $R^4$, $R^5$, x and y have the definition given above and n is 1 can be mixed.

The process according to the invention can be conducted with exclusion of air. The process according to the invention can be conducted under protective gas atmosphere, for example under argon or nitrogen, preferably under nitrogen.

The process according to the invention can be conducted at standard pressure, elevated pressure or reduced pressure. Preferably, the process according to the invention can be conducted at standard pressure.

Elevated pressure may be a pressure of 1.1 bar to 100 bar, preferably of 1.1 bar to 50 bar, more preferably of 1.1 bar to 10 bar and very preferably of 1.1 to 5 bar.

Reduced pressure may be a pressure of 1 mbar to 1000 mbar, preferably 250 mbar to 1000 mbar, more preferably 500 mbar to 1000 mbar.

The process according to the invention can be conducted between 20° C. and 100° C., preferably between 20° C. and 50° C., more preferably between 20° C. and 30° C.

The process according to the invention can be conducted in a solvent, for example methanol, ethanol, propanol, butanol, cyclohexanol, N,N-dimethylformamide, dimethyl sulfoxide, pentane, hexane, cyclohexane, heptane, octane, decane, toluene, xylene, acetone, acetonitrile, carbon tetrachloride, chloroform, dichloromethane, 1,2-dichloroethane, tetrachloroethylene, diethyl ether, methyl tert-butyl ether, methyl ethyl ketone, tetrahydrofuran, dioxane, pyridine or methyl acetate, or a mixture of the aforementioned solvents. The process according to the invention can preferably be conducted without solvent.

The silane mixture according to the invention can be used as adhesion promoter between inorganic materials, for example glass beads, glass flakes, glass surfaces, glass fibres, or oxidic fillers, preferably silicas such as precipitated silicas and fumed silicas,
and organic polymers, for example thermosets, thermoplastics or elastomers, or as crosslinking agents and surface modifiers for oxidic surfaces.

The silane mixture according to the invention can be used as coupling reagents in filled rubber mixtures, examples being tyre treads, industrial rubber articles or footwear soles.

Advantages of the silane mixtures according to the invention are improved rolling resistance and improved dynamic stiffness in rubber mixtures.

EXAMPLES

NMR method: The molar ratios and proportions by mass reported as analysis results in the examples come from $^{13}$C NMR measurements with the following indices: 100.6 MHz, 1000 scans, solvent: $CDCl_3$, internal standard for calibration: tetramethylsilane, relaxation aid: $Cr(acac)_3$; for the determination of the proportion by mass in the product, a defined amount of dimethyl sulfone is added as internal standard and the molar ratios of the products are used to calculate the proportion by mass.

Comparative Example 1

3-octanoylthio-1-propyltriethoxysilane, NXT Silane from Momentive Performance Materials Comparative Example 2 bistriethoxysilyloctane from ABCR GmbH

Comparative Example 3 bis(triethoxysilylpropyl) disulfide from Evonik Industries AG.

Comparative Example 4

1-chloro-6-thiopropyltriethoxysilylhexane NaOEt (21% in EtOH; 1562 g; 4.820 mol) was metered into mercaptopropyltriethoxysilane (1233 g; 5.170 mol) over the course of 1 h while stirring at room temperature. On completion of addition, the reaction mixture was heated at reflux for 2 h and then left to cool to room temperature. The intermediate formed was metered into 1,6-dichlorohexane (4828 g; 31.14 mol) that had been heated to 80° C. over the course of 30 min. On completion of addition, the reaction mixture was heated at reflux for 3 h, before being left to cool to room temperature. The reaction mixture was filtered and the filtercake was rinsed with EtOH. The volatile constituents were removed under reduced pressure and the 1-chloro-6-thiopropyltriethoxysilylhexane intermediate (yield: 89%, molar ratio: 97% 1-chloro-6-thiopropyltriethoxysilylhexane, 3% bis(thiopropyltriethoxysilyl)hexane; % by weight: 95% by weight of 1-chloro-6-thiopropyltriethoxysilylhexane, 5% by weight of 1,6-bis(thiopropyltriethoxysilyl)hexane) was obtained as a colourless to brown liquid.

Comparative Example 5

6-bis(thiopropyltriethoxysilylhexyl) disulfide 6-Bis(thiopropyltriethoxysilylhexyl) disulfide was prepared according to Synthesis Example 1 and Example 1 of EP 1375504.

By contrast with Synthesis Example 1 of EP1375504, the intermediate was not distilled.

Analysis: (88% yield, molar ratio: silane of the formula I: 94%
$(EtO)_3Si(CH_2)_3S(CH_2)_6S_2(CH_2)_6S(CH_2)_3Si(OEt)_3$ and 6% $(EtO)_3Si(CH_2)_3S(CH_2)_6S(CH_2)_3Si(OEt)_3$, % by weight: silane of the formula: 95% by weight of $(EtO)_3Si(CH_2)_3S(CH_2)_6S_2(CH_2)_6S(CH_2)_3Si(OEt)_3$ and 5% by weight of $(EtO)_3Si(CH_2)_3S(CH_2)_6S(CH_2)_3Si(OEt)_3$)

Comparative Example 6

S-(6-((3-(triethoxysilyl)propyl)thio)hexyl) thioacetate $Na_2CO_3$ (59.78 g; 0.564 mol) and an aqueous solution of NaSH (40% in water; 79.04 g; 0.564 mol) were initially charged together with water (97.52 g). Then tetrabutylphosphonium bromide (TBPB) (50% in water; 3.190 g; 0.005 mol) was added and acetyl chloride (40.58 g; 0.517 mol) was added dropwise over the course of 1 h, during which the reaction temperature was kept at 25-32° C. On completion of addition of the acetyl chloride, the mixture was stirred at room temperature for 1 h. Then TBPB (50% in water; 3.190 g; 0.005 mol) and 1-chloro-6-thiopropyltriethoxysilylhexane (from Comparative Example 4; 167.8 g; 0.470 mol) were added and the mixture was heated at reflux for 3-5 h. The progress of the reaction was monitored by means of gas chromatography. Once the 1-chloro-6-thiopropyltriethoxysilylhexane had reacted to an extent of >96%, water was added until all the salts had dissolved and the phases were separated. The volatile constituents of the organic phase were removed under reduced pressure, and S-(6-((3-(triethoxysilyl)propyl)thio)hexyl) thioacetate (yield: 90%, molar ratio: 97% S-(6-((3-(triethoxysilyl)propyl)thio)hexyl) thioacetate, 3% bis(thiopropyltriethoxysilyl)hexane; % by weight: 96% by weight of S-(6-((3-(triethoxysilyl)propyl)

thio)hexyl) thioacetate, 4% by weight of 1,6-bis(thiopropyltriethoxysilyl)hexane) was obtained as a yellow to brown liquid.

Comparative Example 7

S-(6-((3-(triethoxysilyl)propyl)thio)hexyl) thiooctanoate $Na_2CO_3$ (220.2 g; 2.077 mol) and an aqueous solution of NaSH (40% in water; 291.2 g; 2.077 mol) were initially charged together with water (339.2 g). Then tetrabutylammonium bromide (TBAB) (50% in water; 10.96 g; 0.017 mol) was added and octanoyl chloride (307.2 g; 1.889 mol) was added dropwise over the course of 2.5 h, during which the reaction temperature was kept at 24-28° C. On completion of addition of the octanoyl chloride, the mixture was stirred at room temperature for 1 h. Then TBAB (50% in water; 32.88 g; 0.051 mol) and 1-chloro-6-thiopropyltriethoxysilyhexane (from Comparative Example 4, 606.9 g; 1.700 mol) were added and the mixture was heated at reflux for 10 h. Then water was added until all the salts had dissolved and the phases were separated. The volatile constituents of the organic phase were removed under reduced pressure, and S-(6-((3-(triethoxysilyl)propyl)thio)hexyl) thiooctanoate (yield: 95%, molar ratio: 97% S-(6-((3-(triethoxysilyl)propyl)thio)hexyl) thiooctanoate, 3% bis(thiopropyltriethoxysilyl)hexane; % by weight: 96% by weight of S-(6-((3-(triethoxysilyl)propyl)thio)hexyl) thiooctanoate, 4% by weight of 1,6-bis(thiopropyltriethoxysilyl)hexane) was obtained as a yellow to brown liquid.

Comparative Example 8

S-(6-((3-(triethoxysilyl)propyl)thio)hexyl) thiooctadecanoate S-(6-((3-(Triethoxysilyl)propyl)thio)hexyl) thiooctadecanoate was prepared from 1-chloro-6-thiopropyltriethoxysilylhexane (from Comparative Example 4) in accordance with Synthesis Examples 1 and 3 in JP2012149189.
S-(6-((3-(Triethoxysilyl)propyl)thio)hexyl) thiooctadecanoate (yield: 89%, molar ratio: 97% S-(6-((3-(triethoxysilyl)propyl)thio)hexyl) thiooctadecanoate, 3% bis(thiopropyltriethoxysilyl)hexane; % by weight: 97% by weight of S-(6-((3-(triethoxysilyl)propyl)thio)hexyl) thiooctadecanoate, 3% by weight of 1,6-bis(thiopropyltriethoxysilyl) hexane) was obtained as a yellow to brown liquid.

Comparative Example 9

6.84 parts by weight of Comparative Example 1 together with 1.65 parts by weight of Comparative Example 2 were weighed into a flat PE bag and mixed. This mixture corresponds to a molar ratio: 83% $(EtO)_3Si(CH_2)_3SCO(CH_2)_6CH_3$ and 17% $(EtO)_3Si(CH_2)_8Si(OEt)_3$.

Comparative Example 10

6.84 parts by weight of Comparative Example 1 together with 2.47 parts by weight of Comparative Example 2 were weighed into a flat PE bag and mixed. This mixture corresponds to a molar ratio: 77% $(EtO)_3Si(CH_2)_3SCO(CH_2)_6CH_3$ and 23% $(EtO)_3Si(CH_2)_8Si(OEt)_3$.

Comparative Example 11

6.84 parts by weight of Comparative Example 1 together with 3.29 parts by weight of Comparative Example 2 were weighed into a flat PE bag and mixed. This mixture corresponds to a molar ratio: 71% $(EtO)_3Si(CH_2)_3SCO(CH_2)_6CH_3$ and 29% $(EtO)_3Si(CH_2)_8Si(OEt)_3$.

Comparative Example 12

6.30 parts by weight of Comparative Example 1 together with 2.53 parts by weight of Comparative Example 2 were weighed into a flat PE bag and mixed. This mixture corresponds to a molar ratio: 75% $(EtO)_3Si(CH_2)_3SCO(CH_2)_6CH_3$ and 25% $(EtO)_3Si(CH_2)_8Si(OEt)_3$.

Comparative Example 13

4.20 parts by weight of Comparative Example 1 together with 3.79 parts by weight of Comparative Example 2 were weighed into a flat PE bag and mixed. This mixture corresponds to a molar ratio: 57% $(EtO)_3Si(CH_2)_3SCO(CH_2)_6CH_3$ and 43% $(EtO)_3Si(CH_2)_8Si(OEt)_3$.

Comparative Example 14

2.10 parts by weight of Comparative Example 1 together with 5.06 parts by weight of Comparative Example 2 were weighed into a flat PE bag and mixed. This mixture corresponds to a molar ratio: 33% $(EtO)_3Si(CH_2)_3SCO(CH_2)_6CH_3$ and 67% $(EtO)_3Si(CH_2)_8Si(OEt)_3$.

Example 1

6.84 parts by weight of Comparative Example 3 together with 2.53 parts by weight of Comparative Example 2 were weighed into a flat PE bag and mixed. This mixture corresponds to a molar ratio: 71% $(EtO)_3Si(CH_2)_3S_2(CH_2)_3Si(OEt)_3$ and 29% $(EtO)_3Si(CH_2)_8Si(OEt)_3$.

Example 2

6.84 parts by weight of Comparative Example 3 together with 3.79 parts by weight of Comparative Example 2 were weighed into a flat PE bag and mixed. This mixture corresponds to a molar ratio: 63% $(EtO)_3Si(CH_2)_3S_2(CH_2)_3Si(OEt)_3$ and 37% $(EtO)_3Si(CH_2)_8Si(OEt)_3$.

Example 3

6.84 parts by weight of Comparative Example 5 together with 1.70 parts by weight of Comparative Example 2 were weighed into a flat PE bag and mixed. This mixture corresponds to a molar ratio: 66% $(EtO)_3Si(CH_2)_3S(CH_2)_6S_2(CH_2)_6S(CH_2)_3Si(OEt)_3$ and 34% $(EtO)_3Si(CH_2)_8Si(OEt)_3$.

Example 4

6.84 parts by weight of Comparative Example 5 together with 2.55 parts by weight of Comparative Example 2 were weighed into a flat PE bag and mixed. This mixture corresponds to a molar ratio: 58% $(EtO)_3Si(CH_2)_3S(CH_2)_6S_2(CH_2)_6S(CH_2)_3Si(OEt)_3$ and 42% $(EtO)_3Si(CH_2)_8Si(OEt)_3$.

Example 5

6.84 parts by weight of Comparative Example 6 together with 1.51 parts by weight of Comparative Example 2 were weighed into a flat PE bag and mixed. This mixture corresponds to a molar ratio: 80% $(EtO)_3Si(CH_2)_3S(CH_2)_6SCOCH_3$ and 20% $(EtO)_3Si(CH_2)_8Si(OEt)_3$.

Example 6

6.84 parts by weight of Comparative Example 6 together with 2.27 parts by weight of Comparative Example 2 were weighed into a flat PE bag and mixed. This mixture corresponds to a molar ratio: 74% $(EtO)_3Si(CH_2)_3S(CH_2)_6SCOCH_3$ and 26% $(EtO)_3Si(CH_2)_8Si(OEt)_3$.

Example 7

6.84 parts by weight of Comparative Example 7 together with 1.25 parts by weight of Comparative Example 2 were weighed into a flat PE bag and mixed. This mixture corresponds to a molar ratio: 80% $(EtO)_3Si(CH_2)_3S(CH_2)_6SCO(CH_2)_6CH_3$ and 20% $(EtO)_3Si(CH_2)_8Si(OEt)_3$.

Example 8

6.84 parts by weight of Comparative Example 7 together with 1.87 parts by weight of Comparative Example 2 were weighed into a flat PE bag and mixed. This mixture corresponds to a molar ratio: 74% $(EtO)_3Si(CH_2)_3S(CH_2)_6SCO(CH_2)_6CH_3$ and 26% $(EtO)_3Si(CH_2)_8Si(OEt)_3$.

Example 9

6.84 parts by weight of Comparative Example 8 together with 0.97 parts by weight of Comparative Example 2 were weighed into a flat PE bag and mixed. This mixture corresponds to a molar ratio: 80% $(EtO)_3Si(CH_2)_3S(CH_2)_6SCO(CH_2)_{16}CH_3$ and 20% $(EtO)_3Si(CH_2)_8Si(OEt)_3$.

Example 10

6.84 parts by weight of Comparative Example 8 together with 1.45 parts by weight of Comparative Example 2 were weighed into a flat PE bag and mixed. This mixture corresponds to a molar ratio: 74% $(EtO)_3Si(CH_2)_3S(CH_2)_6SCO(CH_2)_{16}CH_3$ and 26% $(EtO)_3Si(CH_2)_8Si(OEt)_3$.

Example 11

5.47 parts by weight of Comparative Example 3 together with 1.26 parts by weight of Comparative Example 2 were weighed into a flat PE bag and mixed. This mixture corresponds to a molar ratio: 80% $(EtO)_3Si(CH_2)_3S_2(CH_2)_3Si(OEt)_3$ and 20% $(EtO)_3Si(CH_2)_8Si(OEt)_3$.

Example 12

4.10 parts by weight of Comparative Example 3 together with 2.53 parts by weight of Comparative Example 2 were weighed into a flat PE bag and mixed. This mixture corresponds to a molar ratio: 60% $(EtO)_3Si(CH_2)_3S_2(CH_2)_3Si(OEt)_3$ and 40% $(EtO)_3Si(CH_2)_8Si(OEt)_3$.

Example 13

2.74 parts by weight of Comparative Example 3 together with 3.79 parts by weight of Comparative Example 2 were weighed into a flat PE bag and mixed. This mixture corresponds to a molar ratio: 40% $(EtO)_3Si(CH_2)_3S_2(CH_2)_3Si(OEt)_3$ and 60% $(EtO)_3Si(CH_2)_8Si(OEt)_3$.

Example 14

1.37 parts by weight of Comparative Example 3 together with 5.06 parts by weight of Comparative Example 2 were weighed into a flat PE bag and mixed. This mixture corresponds to a molar ratio: 20% $(EtO)_3Si(CH_2)_3S_2(CH_2)_3Si(OEt)_3$ and 80% $(EtO)_3Si(CH_2)_8Si(OEt)_3$.

Example 15

8.15 parts by weight of Comparative Example 5 together with 1.26 parts by weight of Comparative Example 2 were weighed into a flat PE bag and mixed. This mixture corresponds to a molar ratio: 74% $(EtO)_3Si(CH_2)_3S(CH_2)_6S_2(CH_2)_6S(CH_2)_3Si(OEt)_3$ and 26% $(EtO)_3Si(CH_2)_8Si(OEt)_3$.

Example 16

6.11 parts by weight of Comparative Example 5 together with 2.53 parts by weight of Comparative Example 2 were weighed into a flat PE bag and mixed. This mixture corresponds to a molar ratio: 56% $(EtO)_3Si(CH_2)_3S(CH_2)_6S_2(CH_2)_6S(CH_2)_3Si(OEt)_3$ and 44% $(EtO)_3Si(CH_2)_8Si(OEt)_3$.

Example 17

4.08 parts by weight of Comparative Example 5 together with 3.79 parts by weight of Comparative Example 2 were weighed into a flat PE bag and mixed. This mixture corresponds to a molar ratio: 38% $(EtO)_3Si(CH_2)_3S(CH_2)_6S_2(CH_2)_6S(CH_2)_3Si(OEt)_3$ and 62% $(EtO)_3Si(CH_2)_8Si(OEt)_3$.

Example 18

2.04 parts by weight of Comparative Example 5 together with 5.06 parts by weight of Comparative Example 2 were weighed into a flat PE bag and mixed. This mixture corresponds to a molar ratio: 19% $(EtO)_3Si(CH_2)_3S(CH_2)_6S_2(CH_2)_6S(CH_2)_3Si(OEt)_3$ and 81% $(EtO)_3Si(CH_2)_8Si(OEt)_3$.

Example 19: 9.14 parts by weight of Comparative Example 6 together with 1.26 parts by weight of Comparative Example 2 were weighed into a flat PE bag and mixed. This mixture corresponds to a molar ratio: 87% $(EtO)_3Si(CH_2)_3S(CH_2)_6SCOCH_3$ and 13% $(EtO)_3Si(CH_2)_8Si(OEt)_3$.

Example 20

6.86 parts by weight of Comparative Example 6 together with 2.53 parts by weight of Comparative Example 2 were weighed into a flat PE bag and mixed. This mixture corresponds to a molar ratio: 72% $(EtO)_3Si(CH_2)_3S(CH_2)_6SCOCH_3$ and 28% $(EtO)_3Si(CH_2)_8Si(OEt)_3$.

Example 21

4.57 parts by weight of Comparative Example 6 together with 3.79 parts by weight of Comparative Example 2 were weighed into a flat PE bag and mixed. This mixture corresponds to a molar ratio: 55% $(EtO)_3Si(CH_2)_3S(CH_2)_6SCOCH_3$ and 45% $(EtO)_3Si(CH_2)_8Si(OEt)_3$.

Example 22

2.29 parts by weight of Comparative Example 6 together with 5.06 parts by weight of Comparative Example 2 were weighed into a flat PE bag and mixed. This mixture corresponds to a molar ratio: 32% $(EtO)_3Si(CH_2)_3S(CH_2)_6SCOCH_3$ and 68% $(EtO)_3Si(CH_2)_8Si(OEt)_3$.

Example 23

11.08 parts by weight of Comparative Example 7 together with 1.26 parts by weight of Comparative Example 2 were weighed into a flat PE bag and mixed. This mixture corresponds to a molar ratio: 85% $(EtO)_3Si(CH_2)_3S(CH_2)_6SCO(CH_2)_6CH_3$ and 15% $(EtO)_3Si(CH_2)_8Si(OEt)_3$.

Example 24

8.31 parts by weight of Comparative Example 7 together with 2.53 parts by weight of Comparative Example 2 were weighed into a flat PE bag and mixed. This mixture corresponds to a molar ratio: 72% $(EtO)_3Si(CH_2)_3S(CH_2)_6SCO(CH_2)_6CH_3$ and 28% $(EtO)_3Si(CH_2)_8Si(OEt)_3$.

Example 25

5.54 parts by weight of Comparative Example 7 together with 3.79 parts by weight of Comparative Example 2 were weighed into a flat PE bag and mixed. This mixture corresponds to a molar ratio: 55% $(EtO)_3Si(CH_2)_3S(CH_2)_6SCO(CH_2)_6CH_3$ and 45% $(EtO)_3Si(CH_2)_8Si(OEt)_3$.

Example 26

2.77 parts by weight of Comparative Example 7 together with 5.06 parts by weight of Comparative Example 2 were weighed into a flat PE bag and mixed. This mixture corresponds to a molar ratio: 32% $(EtO)_3Si(CH_2)_3S(CH_2)_6SCO(CH_2)_6CH_3$ and 68% $(EtO)_3Si(CH_2)_8Si(OEt)_3$.

Example 27

14.32 parts by weight of Comparative Example 8 together with 1.26 parts by weight of Comparative Example 2 were weighed into a flat PE bag and mixed. This mixture corresponds to a molar ratio: 85% $(EtO)_3Si(CH_2)_3S(CH_2)_6SCO(CH_2)_{16}CH_3$ and 15% $(EtO)_3Si(CH_2)_8Si(OEt)_3$.

Example 28

10.74 parts by weight of Comparative Example 8 together with 2.53 parts by weight of Comparative Example 2 were weighed into a flat PE bag and mixed. This mixture corresponds to a molar ratio: 72% $(EtO)_3Si(CH_2)_3S(CH_2)_6SCO(CH_2)_{16}CH_3$ and 28% $(EtO)_3Si(CH_2)_8Si(OEt)_3$.

Example 29

7.16 parts by weight of Comparative Example 8 together with 3.79 parts by weight of Comparative Example 2 were weighed into a flat PE bag and mixed. This mixture corresponds to a molar ratio: 55% $(EtO)_3Si(CH_2)_3S(CH_2)_6SCO(CH_2)_{16}CH_3$ 45% $(EtO)_3Si(CH_2)_8Si(OEt)_3$.

Example 30

5.06 parts by weight of Comparative Example 8 together with 3.58 parts by weight of Comparative Example 2 were weighed into a flat PE bag and mixed. This mixture corresponds to a molar ratio: 48% $(EtO)_3Si(CH_2)_3S(CH_2)_6SCO(CH_2)_{16}CH_3$ and 52% $(EtO)_3Si(CH_2)_8Si(OEt)_3$.

Example 31: Rubber Tests

The formulation used for the rubber mixtures is specified in Table 1 below. The unit phr means parts by weight based on 100 parts of the raw rubber used. The silane mixtures all contain an identical phr amount of silane which reacts with the rubber during the vulcanization. The second silane is added additionally.

TABLE 1

| | Mixture 1/phr | Mixture 2/phr | Mixture 3/phr | Mixture 4/phr Inv. | Mixture 5/phr Inv. | Mixture 6/phr Inv. | Mixture 7/phr Inv. | Mixture 8/phr Inv. | Mixture 9/phr Inv. | Mixture 10/phr Inv. | Mixture 11/phr Inv. | Mixture 12/phr Inv. | Mixture 13/phr Inv. |
|---|---|---|---|---|---|---|---|---|---|---|---|---|---|
| 1st stage | | | | | | | | | | | | | |
| NR[a] | 10.0 | 10.0 | 10.0 | 10.0 | 10.0 | 10.0 | 10.0 | 10.0 | 10.0 | 10.0 | 10.0 | 10.0 | 10.0 |
| BR[b] | 18.0 | 18.0 | 18.0 | 18.0 | 18.0 | 18.0 | 18.0 | 18.0 | 18.0 | 18.0 | 18.0 | 18.0 | 18.0 |
| S-SBR[c] | 72.0 | 72.0 | 72.0 | 72.0 | 72.0 | 72.0 | 72.0 | 72.0 | 72.0 | 72.0 | 72.0 | 72.0 | 72.0 |
| Silica[d] | 95.0 | 95.0 | 95.0 | 95.0 | 95.0 | 95.0 | 95.0 | 95.0 | 95.0 | 95.0 | 95.0 | 95.0 | 95.0 |
| TDAE oil[e] | 50.0 | 50.0 | 50.0 | 50.0 | 50.0 | 50.0 | 50.0 | 50.0 | 50.0 | 50.0 | 50.0 | 50.0 | 50.0 |
| 6PPD[f] | 2.0 | 2.0 | 2.0 | 2.0 | 2.0 | 2.0 | 2.0 | 2.0 | 2.0 | 2.0 | 2.0 | 2.0 | 2.0 |
| Antiozonant wax | 2.0 | 2.0 | 2.0 | 2.0 | 2.0 | 2.0 | 2.0 | 2.0 | 2.0 | 2.0 | 2.0 | 2.0 | 2.0 |
| Zinc oxide | 2.5 | 2.5 | 2.5 | 2.5 | 2.5 | 2.5 | 2.5 | 2.5 | 2.5 | 2.5 | 2.5 | 2.5 | 2.5 |
| Stearic acid | 2.5 | 2.5 | 2.5 | 2.5 | 2.5 | 2.5 | 2.5 | 2.5 | 2.5 | 2.5 | 2.5 | 2.5 | 2.5 |
| Comp. Ex. 9 | 8.49 | | | | | | | | | | | | |
| Comp. Ex. 10 | | 9.31 | | | | | | | | | | | |
| Comp. Ex. 11 | | | 10.13 | | | | | | | | | | |
| Example 1 | | | | 9.37 | | | | | | | | | |
| Example 2 | | | | | 10.63 | | | | | | | | |
| Example 3 | | | | | | 8.54 | | | | | | | |
| Example 4 | | | | | | | 9.39 | | | | | | |
| Example 5 | | | | | | | | 8.35 | | | | | |
| Example 6 | | | | | | | | | 9.11 | | | | |
| Example 7 | | | | | | | | | | 8.09 | | | |
| Example 8 | | | | | | | | | | | 8.71 | | |

TABLE 1-continued

|  | Mixture 1/phr | Mixture 2/phr | Mixture 3/phr | Mixture 4/phr Inv. | Mixture 5/phr Inv. | Mixture 6/phr Inv. | Mixture 7/phr Inv. | Mixture 8/phr Inv. | Mixture 9/phr Inv. | Mixture 10/phr Inv. | Mixture 11/phr Inv. | Mixture 12/phr Inv. | Mixture 13/phr Inv. |
|---|---|---|---|---|---|---|---|---|---|---|---|---|---|
| Example 9 |  |  |  |  |  |  |  |  |  |  |  | 7.81 |  |
| Example 10 |  |  |  |  |  |  |  |  |  |  |  |  | 8.29 |
| 2nd stage |  |  |  |  |  |  |  |  |  |  |  |  |  |
| Stage 1 batch |  |  |  |  |  |  |  |  |  |  |  |  |  |
| 3rd stage |  |  |  |  |  |  |  |  |  |  |  |  |  |
| Stage 2 batch |  |  |  |  |  |  |  |  |  |  |  |  |  |
| DPG[g] | 2.0 | 2.0 | 2.0 | 2.0 | 2.0 | 2.0 | 2.0 | 2.0 | 2.0 | 2.0 | 2.0 | 2.0 | 2.0 |
| CBS[h] | 2.0 | 2.0 | 2.0 | 2.0 | 2.0 | 2.0 | 2.0 | 2.0 | 2.0 | 2.0 | 2.0 | 2.0 | 2.0 |
| Sulfur[i] | 2.0 | 2.0 | 2.0 | 2.0 | 2.0 | 2.0 | 2.0 | 2.0 | 2.0 | 2.0 | 2.0 | 2.0 | 2.0 |

Substances used:
[a]NR TSR SMR 10: natural rubber (TSR = technically specified rubber; SMR = standard
[a]NR TSR: natural rubber (TSR = technically specified rubber).
[b]Europrene Neocis BR 40, from Polimeri.
[c]S-SBR: Sprintan ® SLR-4601, from Trinseo.
[d]Silica: ULTRASIL ® VN 3 GR from Evonik Industries AG (precipitated silica, BET surface area = 175 m$^2$/g).
[e]TDAE oil: TDAE = treated distillate aromatic extract.
[f]6PPD: N-(1,3-dimethylbutyl)-N'-phenyl-p-phenylenediamine (6PPD).
[g]DPG: N,N'-diphenylguanidine (DPG).
[h]CBS: N-cyclohexyl-2-benzothiazolesulfenamide.
[i]Sulfur: ground sulfur.

The mixture was produced by processes customary in the rubber industry in three stages in a laboratory mixer of capacity 300 millilitres to 3 litres, by first mixing, in the first mixing stage (base mixing stage), all the constituents apart from the vulcanization system (sulfur and vulcanization-influencing substances) at 145 to 165° C., target temperatures of 152 to 157° C., for 200 to 600 seconds. In the second stage, the mixture from stage 1 was thoroughly mixed once more, performing what is called a remill. Addition of the vulcanization system in the third stage (ready-mix stage) produced the finished mixture, with mixing at 90 to 120° C. for 180 to 300 seconds. All the mixtures were used to produce test specimens by vulcanization under pressure at 160° C.–170° C. after t95-t100 (measured on a moving disc rheometer to ASTM D 5289-12/ISO 6502).

The general process for producing rubber mixtures and vulcanizates thereof is described in "Rubber Technology Handbook", W. Hofmann, Hanser Verlag 1994.

Rubber testing was effected in accordance with the test methods specified in Table 2. The results of the rubber testing are reported in Table 3.

TABLE 2

| Physical testing | Standard/conditions |
|---|---|
| Viscoelastic properties of the vulcanizate at 70° C., 1.0 Hz Dynamic storage modulus G' at 100% elongation/MPa Loss factor tan δ at 10% elongation | RPA ("rubber process analyzer") in accordance with ASTM D6601 from the second strain sweep |

TABLE 3

|  | Mixture 1 | Mixture 2 | Mixture 3 | Mixture 4 Inv. | Mixture 5 Inv. |
|---|---|---|---|---|---|
| G'(100%) RPA/MPa | 427 | 400 | 422 | 784 | 758 |
| tan δ (10%) RPA | 0.210 | 0.217 | 0.205 | 0.167 | 0.170 |

|  | Mixture 6 Inv. | Mixture 7 Inv. | Mixture 8 Inv. | Mixture 9 Inv. | Mixture 10 Inv. |
|---|---|---|---|---|---|
| G'(100%) RPA/MPa | 729 | 746 | 688 | 702 | 601 |
| tan δ (10%) RPA | 0.160 | 0.156 | 0.164 | 0.164 | 0.169 |

|  | Mixture 11 Inv. | Mixture 12 Inv. | Mixture 13 Inv. |
|---|---|---|---|
| G'(100%) RPA/MPa | 626 | 598 | 585 |
| tan δ (10%) RPA | 0.164 | 0.170 | 0.171 |

Compared to the comparative mixtures, the inventive mixtures feature improved rolling resistance (tan δ measured at 70° C.). Moreover, the silane mixtures according to the invention lead to advantages in dynamic stiffness (G'(100%) measured at 70° C.).

Example 32: Rubber Tests

The formulation used for the rubber mixtures is specified in Table 4 below. The unit phr means parts by weight based on 100 parts of the raw rubber used. In the silane mixtures, some of the silane that reacts with the rubber during the vulcanization is replaced by the second silane which is unreactive toward the rubber.

TABLE 4

|  | Mixture 14/phr | Mixture 15/phr | Mixture 16/phr | Mixture 17/phr Inv. | Mixture 18/phr Inv. | Mixture 19/phr Inv. | Mixture 20/phr Inv. | Mixture 21/phr Inv. | Mixture 22/phr Inv. | Mixture 23/phr Inv. | Mixture 24/phr Inv. | Mixture 25/phr Inv. |
|---|---|---|---|---|---|---|---|---|---|---|---|---|
| 1st stage |  |  |  |  |  |  |  |  |  |  |  |  |
| NR[a] | 10.0 | 10.0 | 10.0 | 10.0 | 10.0 | 10.0 | 10.0 | 10.0 | 10.0 | 10.0 | 10.0 | 10.0 |
| BR[b] | 18.0 | 18.0 | 18.0 | 18.0 | 18.0 | 18.0 | 18.0 | 18.0 | 18.0 | 18.0 | 18.0 | 18.0 |
| S-SBR[c] | 72.0 | 72.0 | 72.0 | 72.0 | 72.0 | 72.0 | 72.0 | 72.0 | 72.0 | 72.0 | 72.0 | 72.0 |

TABLE 4-continued

| | | | | | | | | | | | | |
|---|---|---|---|---|---|---|---|---|---|---|---|---|
| Silica[d] | 95.0 | 95.0 | 95.0 | 95.0 | 95.0 | 95.0 | 95.0 | 95.0 | 95.0 | 95.0 | 95.0 | 95.0 |
| TDAE oil[e] | 50.0 | 50.0 | 50.0 | 50.0 | 50.0 | 50.0 | 50.0 | 50.0 | 50.0 | 50.0 | 50.0 | 50.0 |
| 6PPD[f] | 2.0 | 2.0 | 2.0 | 2.0 | 2.0 | 2.0 | 2.0 | 2.0 | 2.0 | 2.0 | 2.0 | 2.0 |
| Antiozonant wax | 2.0 | 2.0 | 2.0 | 2.0 | 2.0 | 2.0 | 2.0 | 2.0 | 2.0 | 2.0 | 2.0 | 2.0 |
| Zinc oxide | 2.5 | 2.5 | 2.5 | 2.5 | 2.5 | 2.5 | 2.5 | 2.5 | 2.5 | 2.5 | 2.5 | 2.5 |
| Stearic acid | 2.5 | 2.5 | 2.5 | 2.5 | 2.5 | 2.5 | 2.5 | 2.5 | 2.5 | 2.5 | 2.5 | 2.5 |
| Comp. Ex. 12 | 8.83 | | | | | | | | | | | |
| Comp. Ex. 13 | | 7.99 | | | | | | | | | | |
| Comp. Ex. 14 | | | 7.16 | | | | | | | | | |
| Example 11 | | | | 6.73 | | | | | | | | |
| Example 12 | | | | | 6.63 | | | | | | | |
| Example 13 | | | | | | 6.53 | | | | | | |
| Example 14 | | | | | | | 6.43 | | | | | |
| Example 15 | | | | | | | | 9.41 | | | | |
| Example 16 | | | | | | | | | 8.64 | | | |
| Example 17 | | | | | | | | | | 7.87 | | |
| Example 18 | | | | | | | | | | | 7.10 | |
| Example 19 | | | | | | | | | | | | 10.40 |
| 2nd stage | | | | | | | | | | | | |
| Stage 1 batch | | | | | | | | | | | | |
| 3rd stage | | | | | | | | | | | | |
| Stage 2 batch | | | | | | | | | | | | |
| DPG[g] | 2.0 | 2.0 | 2.0 | 2.0 | 2.0 | 2.0 | 2.0 | 2.0 | 2.0 | 2.0 | 2.0 | 2.0 |
| CBS[h] | 2.0 | 2.0 | 2.0 | 2.0 | 2.0 | 2.0 | 2.0 | 2.0 | 2.0 | 2.0 | 2.0 | 2.0 |
| Sulfur[i] | 2.0 | 2.0 | 2.0 | 2.0 | 2.0 | 2.0 | 2.0 | 2.0 | 2.0 | 2.0 | 2.0 | 2.0 |

| | Mixture 26/phr Inv. | Mixture 27/phr Inv. | Mixture 28/phr Inv. | Mixture 29/phr Inv. | Mixture 30/phr Inv. | Mixture 31/phr Inv. | Mixture 32/phr Inv. | Mixture 33/phr Inv. | Mixture 34/phr Inv. | Mixture 35/phr Inv. | Mixture 36/phr Inv. |
|---|---|---|---|---|---|---|---|---|---|---|---|
| 1st stage | | | | | | | | | | | |
| NR[a] | 10.0 | 10.0 | 10.0 | 10.0 | 10.0 | 10.0 | 10.0 | 10.0 | 10.0 | 10.0 | 10.0 |
| BR[b] | 18.0 | 18.0 | 18.0 | 18.0 | 18.0 | 18.0 | 18.0 | 18.0 | 18.0 | 18.0 | 18.0 |
| S-SBR[c] | 72.0 | 72.0 | 72.0 | 72.0 | 72.0 | 72.0 | 72.0 | 72.0 | 72.0 | 72.0 | 72.0 |
| Silica[d] | 95.0 | 95.0 | 95.0 | 95.0 | 95.0 | 95.0 | 95.0 | 95.0 | 95.0 | 95.0 | 95.0 |
| TDAE oil[e] | 50.0 | 50.0 | 50.0 | 50.0 | 50.0 | 50.0 | 50.0 | 50.0 | 50.0 | 50.0 | 50.0 |
| 6PPD[f] | 2.0 | 2.0 | 2.0 | 2.0 | 2.0 | 2.0 | 2.0 | 2.0 | 2.0 | 2.0 | 2.0 |
| Antiozonant wax | 2.0 | 2.0 | 2.0 | 2.0 | 2.0 | 2.0 | 2.0 | 2.0 | 2.0 | 2.0 | 2.0 |
| Zinc oxide | 2.5 | 2.5 | 2.5 | 2.5 | 2.5 | 2.5 | 2.5 | 2.5 | 2.5 | 2.5 | 2.5 |
| Stearic acid | 2.5 | 2.5 | 2.5 | 2.5 | 2.5 | 2.5 | 2.5 | 2.5 | 2.5 | 2.5 | 2.5 |
| Example 20 | 9.39 | | | | | | | | | | |
| Example 21 | | 8.36 | | | | | | | | | |
| Example 22 | | | 7.35 | | | | | | | | |
| Example 23 | | | | 12.34 | | | | | | | |
| Example 24 | | | | | 10.84 | | | | | | |
| Example 25 | | | | | | 9.33 | | | | | |
| Example 26 | | | | | | | 7.83 | | | | |
| Example 27 | | | | | | | | 15.58 | | | |
| Example 28 | | | | | | | | | 13.27 | | |
| Example 29 | | | | | | | | | | 10.95 | |
| Example 30 | | | | | | | | | | | 8.64 |
| 2nd stage | | | | | | | | | | | |
| Stage 1 batch | | | | | | | | | | | |
| 3rd stage | | | | | | | | | | | |
| Stage 2 batch | | | | | | | | | | | |
| DPG[g] | 2.0 | 2.0 | 2.0 | 2.0 | 2.0 | 2.0 | 2.0 | 2.0 | 2.0 | 2.0 | 2.0 |
| CBS[h] | 2.0 | 2.0 | 2.0 | 2.0 | 2.0 | 2.0 | 2.0 | 2.0 | 2.0 | 2.0 | 2.0 |
| Sulfur[i] | 2.0 | 2.0 | 2.0 | 2.0 | 2.0 | 2.0 | 2.0 | 2.0 | 2.0 | 2.0 | 2.0 |

Substances used:
[a]NR TSR: natural rubber (TSR = technically specified rubber).
[b]Europrene Neocis BR 40, from Polimeri.
[c]S-SBR: Sprintan ® SLR-4601, from Trinseo.
[d]Silica: ULTRASIL ® VN 3 GR from Evonik Industries AG (precipitated silica, BET surface area = 175 m$^2$/g).
[e]TDAE oil: TDAE = treated distillate aromatic extract.
[f]6PPD: N-(1,3-dimethylbutyl)-N'-phenyl-p-phenylenediamine (6PPD).
[g]DPG: N,N'-diphenylguanidine (DPG).
[h]CBS: N-cyclohexyl-2-benzothiazolesulfenamide.
[i]Sulfur: ground sulfur.

The mixture was produced in processes customary in the rubber industry in three stages in a laboratory mixer of capacity 300 millilitres to 3 litres, by first mixing, in the first mixing stage (base mixing stage), all the constituents apart from the vulcanization system (sulfur and vulcanization-influencing substances) at 145 to 165° C., target temperatures of 152 to 157° C., for 200 to 600 seconds. In the second stage, the mixture from stage 1 was thoroughly mixed once more, performing what is called a remill. Addition of the vulcanization system in the third stage (ready-mix stage) produced the finished mixture, with mixing at 90 to 120° C. for 180 to 300 seconds. All the mixtures were used to produce test specimens by vulcanization under pressure at 160° C.–170° C. after t95-t100 (measured on a moving disc rheometer to ASTM D 5289-12/ISO 6502).

The general process for producing rubber mixtures and vulcanizates thereof is described in "Rubber Technology Handbook", W. Hofmann, Hanser Verlag 1994.

Rubber testing was effected in accordance with the test method specified in Table 2. The results of the rubber testing are reported in Table 5.

TABLE 5

|  | Mixture 14 | Mixture 15 | Mixture 16 | Mixture 17 Inv. | Mixture 18 Inv. |
|---|---|---|---|---|---|
| G'(100%) RPA/MPa | 417 | 387 | 403 | 684 | 678 |
| tan δ (10%) RPA | 0.214 | 0.221 | 0.223 | 0.187 | 0.180 |
|  | Mixture 19 Inv. | Mixture 20 Inv. | Mixture 21 Inv. | Mixture 22 Inv. | Mixture 23 Inv. |
| G'(100%) RPA/MPa | 708 | 571 | 731 | 726 | 683 |
| tan δ (10%) RPA | 0.172 | 0.196 | 0.155 | 0.158 | 0.166 |
|  | Mixture 24 Inv. | Mixture 25 Inv. | Mixture 26 Inv. | Mixture 27 Inv. | Mixture 28 Inv. |
| G'(100%) RPA/MPa | 598 | 689 | 700 | 678 | 695 |
| tan δ (10%) RPA | 0.183 | 0.164 | 0.163 | 0.167 | 0.163 |
|  | Mixture 29 Inv. | Mixture 30 Inv. | Mixture 31 Inv. | Mixture 32 Inv. | Mixture 33 Inv. |
| G'(100%) RPA/MPa | 639 | 632 | 642 | 589 | 569 |
| tan δ (10%) RPA | 0.148 | 0.161 | 0.171 | 0.179 | 0.147 |
|  | Mixture 34 Inv. | Mixture 35 Inv. | Mixture 36 Inv. |  |  |
| G'(100%) RPA/MPa | 594 | 603 | 573 |  |  |
| tan δ (10%) RPA | 0.154 | 0.165 | 0.179 |  |  |

The partial exchange of the rubber-reactive silane for the second silane leads to improved rolling resistance (tan δ measured at 70° C.) in the mixtures according to the invention compared to the comparative mixtures. Moreover, the silane mixtures according to the invention lead to advantages in dynamic stiffness (G'(100%) measured at 70° C.).

The invention claimed is:

1. A silane mixture, comprising:
a silane of formula I $$(R^1)_y(R^2)_{3-y}Si-R^3-(S-R^4)_n-S_x-R^5 \qquad (I)$$

and a silane of formula II $$(R^1)_y(R^2)_{3-y}Si-R^3-Si(R^1)_y(R^2)_{3-y} \qquad (II)$$

where $R^1$ is the same or different and is a C1-C10-alkoxy group, a phenoxy group, a C4-C10-cycloalkoxy group or an alkyl polyether group —O—$(R^6-O)_r-R^7$ where $R^6$ is the same or different and is a branched or unbranched, saturated or unsaturated, aliphatic, aromatic or mixed aliphatic/aromatic divalent C1-C30 hydrocarbon group, r is an integer from 1 to 30, and $R^7$ is an unsubstituted or substituted, branched or unbranched monovalent alkyl, alkenyl, aryl or aralkyl group, $R^2$ is the same or different and is a C6-C20-aryl group, a C1-C10-alkyl group, a C2-C20-alkenyl group, a C7-C20-aralkyl group or halogen, $R^3$ is the same or different and is a branched or unbranched, saturated or unsaturated, aliphatic, aromatic or mixed aliphatic/aromatic divalent C1-C30 hydrocarbon group, $R^4$ is the same or different and is a branched or unbranched, saturated or unsaturated, aliphatic, aromatic or mixed aliphatic/aromatic divalent C1-C30 hydrocarbon group, x is an integer from 1 to 10" with "x an integer of 1 or from 5 to 10, when x is 1, $R^5$ is hydrogen or a —C(=O)—$R^8$ group with $R^8$=hydrogen, a C1-C20 alkyl group, a C6-C20-aryl group, a C2-C20-alkenyl group or a C7-C20-aralkyl group and n is 1, when x is 5 to 10, $R^5$ is —$(R^4-S)_n-R^3-Si(R^1)_y(R^2)_{3-y}$ and n is 1, and y is the same or different and is 1, 2 or 3, and the molar ratio of the silane of the formula I to the silane of the formula II is 15:85-90:10.

2. The silane mixture according to claim 1, wherein the silane of the formula I is
(EtO)$_3$Si—(CH$_2$)$_3$—S—(CH$_2$)$_6$—S—C(=O)—CH$_3$,
(EtO)$_3$Si—(CH$_2$)$_3$—S—(CH$_2$)$_6$—S—C(=O)—C$_7$H$_{15}$
or (EtO)$_3$Si—(CH$_2$)$_3$—S—(CH$_2$)$_6$—S—C(=O)—C$_{17}$H$_{35}$ and the silane of the formula II is (EtO)$_3$Si—(CH$_2$)$_8$—Si(OEt)$_3$.

3. The silane mixture according to claim 1, wherein the molar ratio of the silane of the formula I to the silane of the formula II is 30:70-86:14.

4. A process for preparing the silane mixture according to claim 1, wherein the silane of the formula I and the silane of the formula II are mixed in a molar ratio of 15:85-90:10.

5. The process for preparing the silane mixture according claim 4, wherein the molar ratio of the silane of the formula I to the silane of the formula II is 30:70-86:14.

6. The process for preparing the silane mixture according claim 4, wherein the silane of the formula I is (EtO)$_3$Si—(CH$_2$)$_3$—S—(CH$_2$)$_6$—S—C(=O)—CH$_3$, (EtO)$_3$Si—(CH$_2$)$_3$—S—(CH$_2$)$_6$—S—C(=O)—C$_7$H$_{15}$ or (EtO)$_3$Si—(CH$_2$)$_3$—S—(CH$_2$)$_6$—S—C(=O)—C$_{17}$H$_{35}$ and the silane of the formula II is (EtO)$_3$Si—(CH$_2$)$_8$—Si(OEt)$_3$.

7. A silane mixture, comprising:
a silane of formula I $$(R^1)_y(R^2)_{3-y}Si-R^3-(S-R^4)_n-S_x-R^5 \qquad (I)$$

and a silane of formula II $$(R^1)_y(R^2)_{3-y}Si-R^3-Si(R^1)_y(R^2)_{3-y} \qquad (II)$$

where $R^1$ is the same or different and is a C1-C10-alkoxy group, a phenoxy group, a C4-C10-cycloalkoxy group or an alkyl polyether group —O—$(R^6-O)_r-R^7$ where $R^6$ is the same or different and is a branched or unbranched, saturated or unsaturated, aliphatic, aromatic or mixed aliphatic/aromatic divalent C1-C30 hydrocarbon group, r is an integer from 1 to 30, and $R^7$ is an unsubstituted or substituted, branched or unbranched monovalent alkyl, alkenyl, aryl or aralkyl group, $R^2$ is the same or different and is a C6-C20-aryl group, a C1-C10-alkyl group, a C2-C20-alkenyl group, a C7-C20-aralkyl group or halogen, $R^3$ is the same or different and is a branched or unbranched, saturated or unsaturated, aliphatic, aromatic or mixed aliphatic/aromatic divalent C1-C30 hydrocarbon group, $R^4$ is the same or different and is a branched or unbranched, saturated or unsaturated, aliphatic, aromatic or mixed aliphatic/aromatic divalent C1-C30 hydrocarbon group, x is an integer from 1 to 10, when x is 1, $R^5$ is hydrogen or a $-C(=O)-R^8$ group with $R^8$=hydrogen, a C1-C20 alkyl group, a C6-C20-aryl group, a C2-C20-alkenyl group or a C7-C20-aralkyl group and n is 1, 2 or 3, when x is 2 to 4, $R^5$ is $-(R^4-S)_n-R^3-Si(R^1)_y(R^2)_{3-y}$ and n is 2 or 3, when x is 5 to 10, $R^5$ is $-(R^4-S)_n-R^3-Si(R^1)_y(R^2)_{3-y}$ and n is 0, 1, 2 or 3, and y is the same or different and is 1, 2 or 3, and the molar ratio of the silane of the formula I to the silane of the formula II is 15:85-90:10.

8. The silane mixture according to claim 7, wherein when x is 2 to 10, $R^5$ is $-(R^4-S)_n-R^3-Si(R^1)_y(R^2)_{3-y}$ and n is 2 or 3.

9. The silane mixture according to claim 7, wherein n is 1.

10. The silane mixture according to claim 7, wherein the silane of the formula I is $(EtO)_3Si-(CH_2)_3-S-(CH_2)_6-S-C(=O)-CH_3$, $(EtO)_3Si-(CH_2)_3-S-(CH_2)_6-S-C(=O)-C_7H_{15}$ or $(EtO)_3Si-(CH_2)_3-S-(CH_2)_6-S-C(=O)-C_{17}H_{35}$ and the silane of the formula II is $(EtO)_3Si-(CH_2)_8-Si(OEt)_3$.

11. The silane mixture according to claim 7, wherein the molar ratio of the silane of the formula I to the silane of the formula II is 30:70-86:14.

* * * * *